July 5, 1960
M. TEN BOSCH ET AL
2,943,493
ACCELEROMETER
Filed Feb. 23, 1954
3 Sheets-Sheet 1
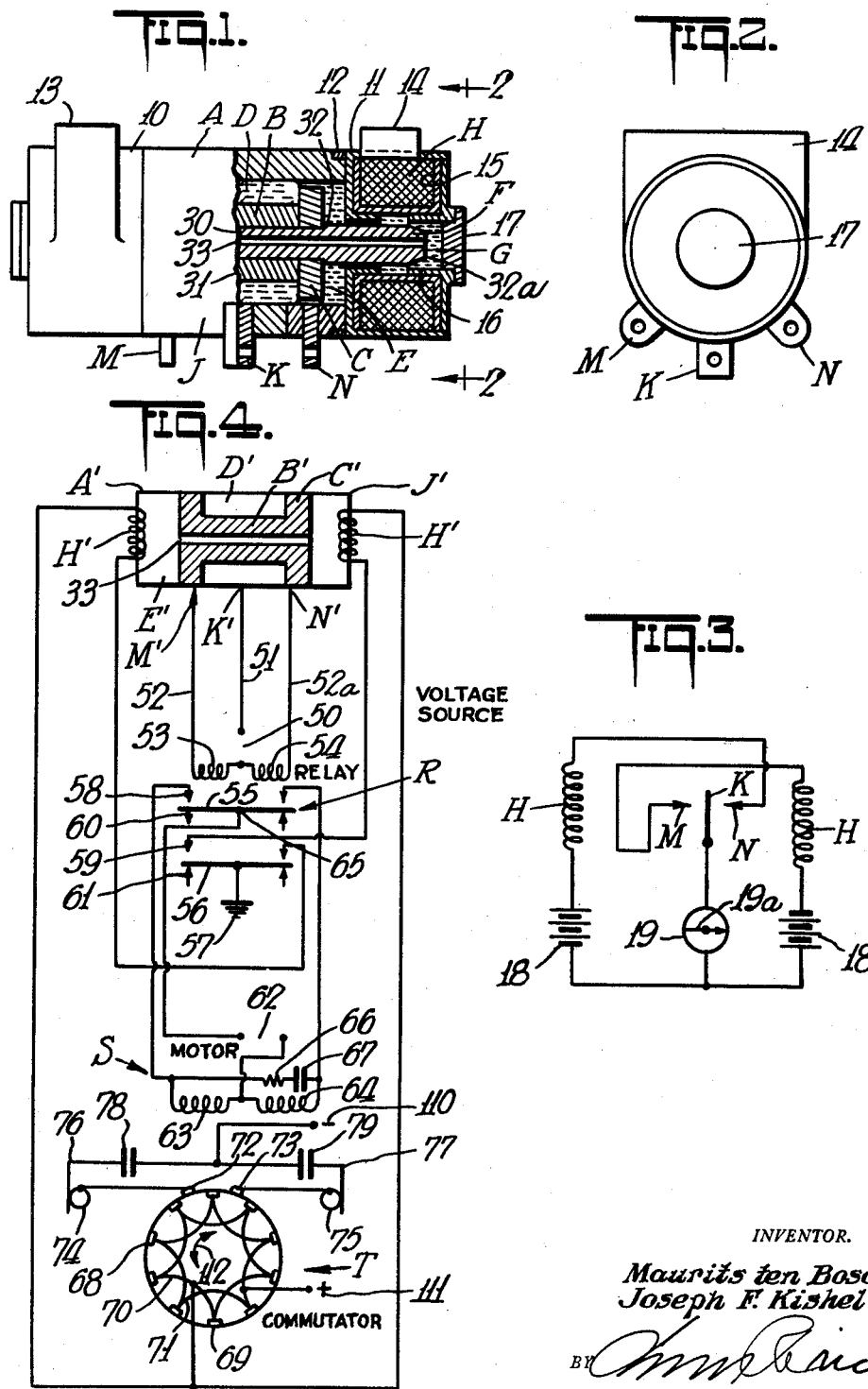
INVENTOR.
Maurits ten Bosch
Joseph F. Kishel
BY
ATTORNEY

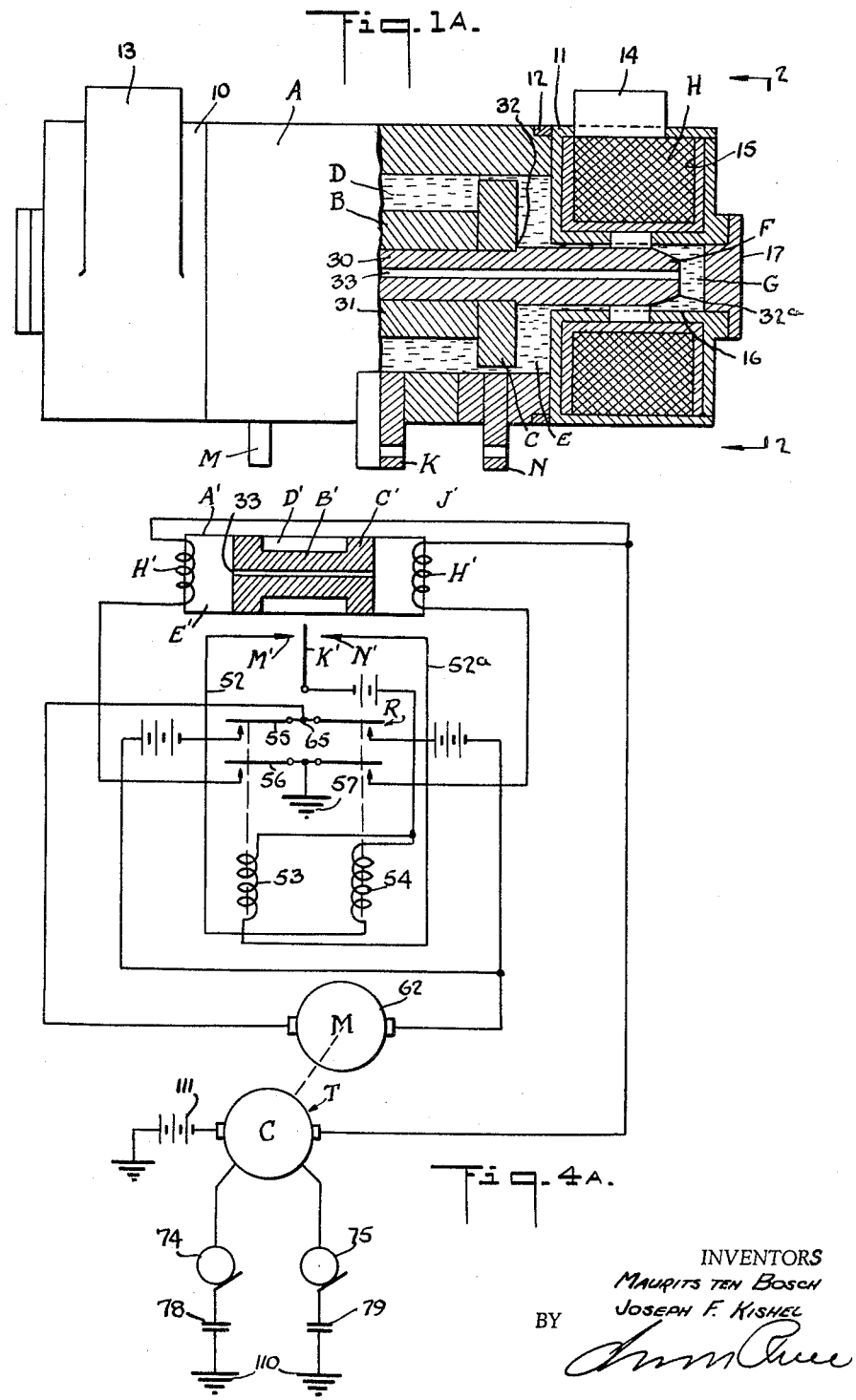

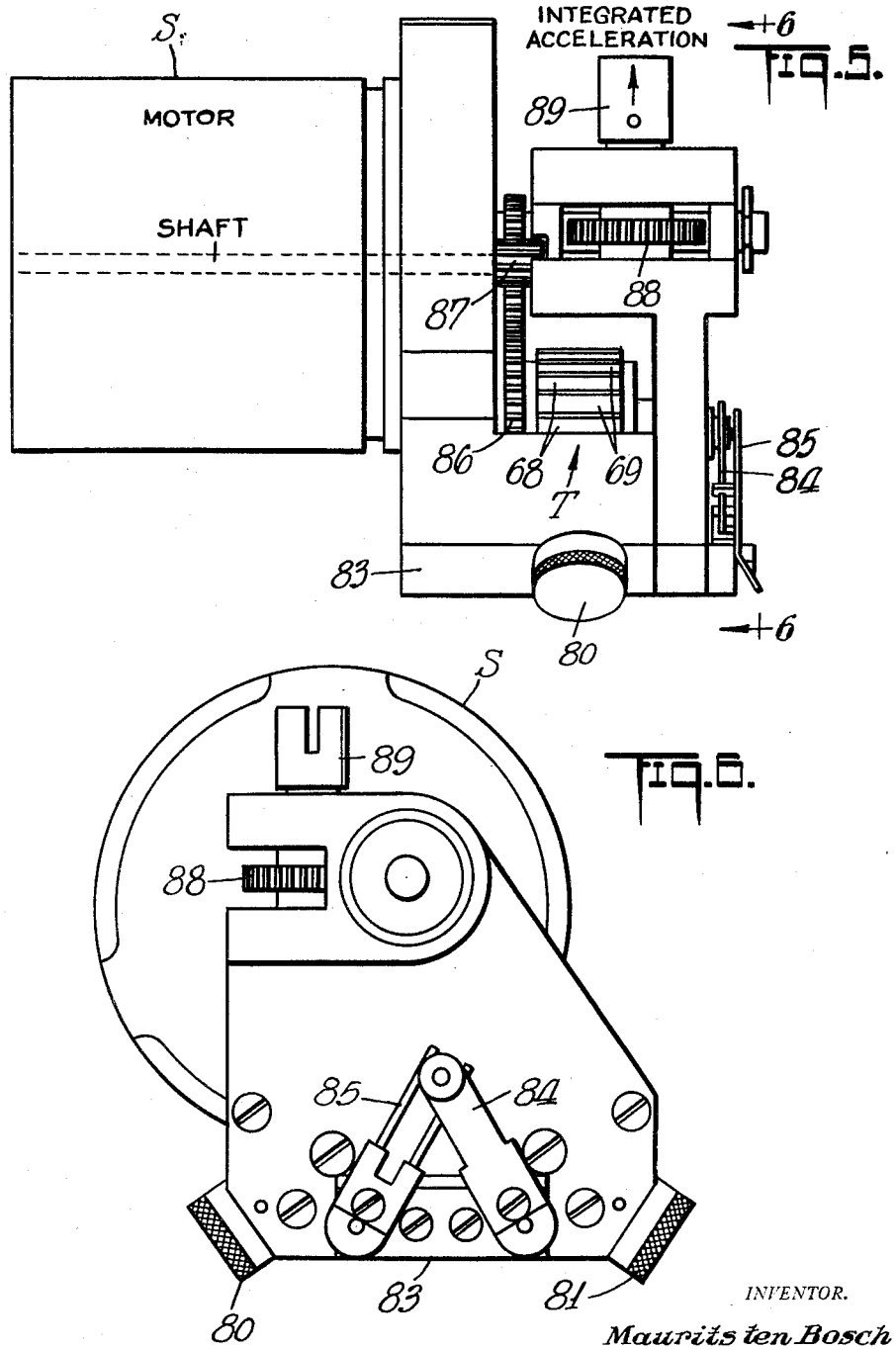

United States Patent Office 2,943,493
Patented July 5, 1960

2,943,493

ACCELEROMETER

Maurits ten Bosch, White Plains, and Joseph F. Kishel, Pleasantville, N.Y., assignors to M. ten Bosch, Inc., a corporation of New York Filed Feb. 23, 1954, Ser. No. 411,845

20 Claims. (Cl. 73—503)

This invention relates to an integrating velocity meter, and it particularly relates to a device for determining the acceleration and/or velocity changes of a vehicle and particularly an air-borne vehicle or aircraft.

It is among the objects of the present invention to provide a simple, self-contained, compact integrating accelerometer device which will promptly and effectively indicate either positive or negative acceleration of an aircraft or other high speed carrier or projectile and which at the same time will be of relatively inexpensive construction.

Another object is to provide a novel integrating accelerometer which will be reliable in operation and which will accurately determine negative and positive acceleration regardless of spin or other movement and which will be a self-contained unit not requiring frequent servicing or adjustment, repair or assembly by skilled workmen.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a velocity meter with a frictionless floating piston. The accelerometer is desirably provided with an electrical circuit which will include a meter arrangement or output shaft which will give an integrated or nonintegrated reading.

In the preferred form, the piston is enclosed in a cylinder with the cylinder axis extending parallelly to the direction in which the acceleration is to be measured.

The mass of the piston assembly is so equalized in respect to the density of the fluid in which the piston floats that the piston will be balanced in all directions except in the direction of the longitudinal axis in which the acceleration is to be determined.

The piston when displaced in either direction, due to acceleration or deceleration, will establish an electric circuit. This circuit, upon being established, will actuate a measuring device or suitable meter.

At the same time as the piston is displaced a restoring device or arrangement will be actuated to move the piston back to its normal, constant velocity or at-rest position.

In one preferred form, a double-headed or dumbbell-shaped piston is provided between the heads of which is positioned a pool of mercury, which normally will, in central position of the piston, be devoid of circuit connection.

The piston will, desirably, be positioned in a non-conducting cylinder without contacting the walls thereof. The cylinder may be made of glass or ceramic material, which will have electrical contact points to establish a circuit when the piston and the mercury pool received between the double heads is displaced to one end or the other end of the cylinder.

The ends of the piston are provided with elongated extensions of a magnetic material, such as steel, which project within and move within the coils of electro-magnets. The cylinder ends beyond the ends of the piston is filled by an inert, non-conducting liquid body. This liquid body may be a silicone oil. The oil or inert liquid will fill up the cylinder throughout the space which is not occupied by the annular mercury pool between the heads of the piston.

The inert fluid or silicone oil may flow from end to end of the piston through a central bore through the piston. At all times the cylinder structure will be completely filled with liquid, the ends of the cylinder being filled with the inert oil and the middle portion of the cylinder between the heads of the piston being filled with a conducting fluid, such as mercury, which in addition to serving as a conductor also floats the piston.

Thus, the piston is suspended, about its principal axis, in neutral equilibrium and without contact with the cylinder walls. This suspension results in elimination of static friction along the sensitive axis of the device.

The return movement of the piston is accomplished by the circuit established through the mercury pool when it is displaced to one or the other side as a result of the applied acceleration or deceleration.

In the simplest form, the circuit may be directly established to restore the piston, while in other forms a pulse generator may be provided to restore the piston.

In the former case, suitable meters or gauges may be placed in the circuit established by the movement of the mercury pool so as to determine the amount and intensity of the acceleration.

The latter method provides a closed loop method for measuring the integrated acceleration as a shaft rotation.

In the preferred form of the integrating accelerometer of the present invention, the device will measure accelerations ranging from plus or minus six times the force of gravity and the entire device may be kept down to overall dimensions less than six inches and usually less than two inches to three inches.

Since the piston at no time will be in frictional contact with the cylinder, due to the mercury pool which acts to float the piston, the device will be highly sensitive to changes in velocity or acceleration in the direction of the axis of the device.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side elevational view partly in longitudinal section of one form of velocity meter device according to the present invention.

Fig. 1a is an enlarged cross sectional view similar to Fig. 1, more clearly showing constituent elements, particularly the mercury pool.

Fig. 2 is an end elevational view of the device of Fig. 1 taken upon the line 2—2 of Fig. 1.

Fig. 3 is a schematic diagrammatic layout of an acceleration measuring circuit associated with the velocity meter of Figs. 1 and 2.

Fig. 4 is a diagrammatic alternative electrical circuit arrangement employing the velocity meter of Figs. 1 and 2.

Fig. 4a is a supplemental alternative circuit arrangement showing some of the connections of the lower part of Fig. 4.

Fig. 5 is a side elevational view of an acceleration integrating arrangement used in conjunction with the accelerometer of Figs. 1 and 2 and the circuit arrangement of Fig. 4.

Fig. 6 is an end elevational view taken upon the line 6—6 of Fig. 5.

Referring particularly to Figs. 1 and 2, there is shown a velocity meter device A having a piston B with the double head structure C which is floated by means of the intervening mercury pool D. The ends of the cylinder are filled by the inert liquid body, such as silicone oil, E. The position of the mercury D and the oil bodies E may be reversed, if desired.

The piston is provided with an axial member F. The member F has ferro-magnetic extensions which are received inside the end closure G. The enclosures G are encircled by the electro-magnetic coils H.

The cylinder J may be of glass, ceramic or other insulating material and it carries the central electric contact K, which is always in contact with the pool of mercury D and the end contacts M and N, which are only in contact with the mercury D when the piston B is displaced to one side or the other side from central position.

Referring specifically to the arrangement shown in Figs. 1 and 2, the cylinder J, which may be of glass, is held in position between the casings 10 and 11 and the annular gasket 12.

The casings 10 and 11 carry the mounting members or lugs 13 and 14.

Inside of the annular casing 11 is the casing 15 of the solenoid arrangement H.

The annular casing 11 has a central opening 16 which forms the extension chamber G receiving the oil body. This chamber G is provided with an end plug 17.

The sides of the glass cylinder or insulating cylinder member J receive the nickel contact members K, M, N and the contact member K will always be in contact with the mercury D.

Referring to the circuit arrangement as shown in Fig. 3, the contacts K, M and N together with the mercury pool D form a switch arrangement to which the voltage is applied by the voltage source 18.

The establishment of a circuit between the central contact K and either side contact M or N through mercury pool D energises either coil H which will act to restore the piston B. The meter 19 will give a reading.

It will be noted that the piston B has a central, longitudinal, two-piece steel shaft 30 upon which is positioned the spacer sleeve 31. The spacer sleeve 31 will press the glass heads C against the shoulder 32. The end of the shaft 30 terminates at 32a adjacent the end plugs 17.

The shaft F is provided with a central passageway 33 through which the oil in the spaces E and G of Fig. 1 may flow from one end of the chamber to the other.

When the piston B is shifted to either side of the cylinder J by the acceleration forces applied, a circuit will be established either between the contacts K and M or K and N. This circuit will energize the right or lefthand solenoid coils H and at the same time will cause a reading upon the meter 19.

The energization of a solenoid H will tend to restore the piston B to its middle position. The average meter reading at 19 will give the amount of the acceleration.

The flow of the oil through the passage 33, as the piston moves from its middle position, will set up a damping effect and the velocity or displacement of the piston per unit time will be proportional to the externally applied acceleration.

The end spaces E and G will permit the piston to continue moving when acceleration in excess of that which coils H are able to sustain is applied. This will give a memory effect.

Acceleration forces in excess of the restoration capacity of the restoring coil H may be applied without loss of information. In such case the piston will continue to move without meeting a stop and such movement will be measured.

An important feature of the present invention resides in the fact that the piston body is floated in neutral equilibrium in all directions perpendicular to the axis of the piston and will be free to move longitudinally of or parallelly to the piston axis.

There will be no contact between the piston and wall of the cylinder since the weights are so adjusted, taking in account the end oil pools, that there will be sufficient buoyancy to overcome the force of gravity.

The annular pool of mercury which floats the piston B is displaced by the piston B in an amount equal to the weight of the piston. At the same time the clearance around the heads C is so narrow, being of the order of .002 to .003 inch, that the mercury will not pass through the clearance into the ends of the cylinder indicated at E in Fig. 1 while the oil in the ends of the cylinder E will not pass through the clearance into the annular space D around the piston B.

By reason of the pumping effect achieved by forcing the oil from one end pocket E to the other end pocket E, the velocity of the piston is kept constant or fixed for a given applied acceleration since this pumping effect will be equal and opposite to the acceleration force in order that the device may act as an integrating accelerometer.

The pulsing force which is used, resulting from the commutator of Fig. 4 to replace the piston to its neutral position, is independent of the characteristics of the motor or other electrical system and the variations which may arise from a steady force application is avoided.

The essential feature of the present invention which distinguishes it is the use of the annular pool of mercury which is retained between the heads C because of the small clearance around the heads C and the high surface tension of the mercury.

In the embodiment of Figs. 4, 5 and 6, correspondingly functioning parts are represented by the same numerals and letters as in Figs. 1 and 2, which are, however, primed.

The piston-cylinder device as indicated by cylinder A' and piston B' in the upper part of Fig. 4 is the same as in Fig. 1.

The difference, however, resides in the recording mechanism and in the circuit arrangement, both shown diagrammatically in Fig. 4. This method results in integration of the applied acceleration.

In the arrangement shown diagrammatically in Fig. 4, the voltage source is indicated at 50 and it has connections 51, 52, and 52a to the cylinder contacts K', M' and N'.

The coils 53 and 54 of the relay device R move the armatures 55 and 56. The relay R is grounded at 57. The relay R has the upper contact points 58 and 59 and the lower contact points 60 and 61. The relay R serves as a grounding and motor-starting relay and it has high resistance coils of about 10,000 ohms' rating. The voltage source 50 is usually of a rating of 28 volts or less.

A voltage source of 115 volts is indicated at 62 in Fig. 4 and this voltage source is connected to the coils 63 and 64 of the motor S, and also to the contacts 58 as well as to the center contacts 65 of the upper armature 55. There is also included in the shunt line the resistance 66 and the capacity 67, which determines the direction of motor rotation.

The commutator T, in the form shown, has ten commutator segments arranged in alternating groups of five, as indicated at 68 and 69. These alternate groups 68 and 69 are connected by the wiring connections 70 and 71, respectively.

The brushes 72 and 73 are connected to the slip rings 74 and 75, which in turn are connected by the lines 76 and 77 to the condensers 78 and 79. The condensers 78 and 79 discharge through one of the coils H', restoring the piston B'.

The brushes 72 and 73 of Fig. 4 are held by the screw-in caps 80 and 81 of Fig. 6. The commutator segments are indicated partially in Fig. 4 at 68 and 69, and they are connected to the slip rings 74 and 75. The motor will drive a pinion 87 meshing with a large gear 86. This pinion 87 will drive the wheel 88, which in turn, through the connections 89, will constitute the output of the device.

When a force due to acceleration is applied parallel to the longitudinal axis, the piston B or B' moves from its middle position, establishing a circuit between contacts K and N or contacts K and M.

In the circuit of Fig. 3 this circuit will immediately apply a restoring force through either coil H and will give a reading on the meter 19.

This reading on meter 19 will depend on the magnitude of the applied force. This operation continues as long as the force is applied, with the needle of the meter 19 vibrating about an average value, proportional to the applied acceleration.

The meter reading on meter 19 is linear and will be independent of the force-current characteristics of the coil H. On the average the force due to acceleration and the restoring force will balance each other until the external force is removed, whereupon almost instantaneously the piston will return to its middle position.

If the acceleration force increases the needle 19a of the meter 19 will move to a higher value, proportional to the change.

The meter 19 may be calibrated in knots or feet per second squared or in gravity units.

In the circuit of Fig. 4 the restoring current is derived from the condensers 78 and 79. The commutator T acts as a switch alternately to charge and permit discharge of the condensers 78 and 79.

The condensers 78 and 79 are alternately charged and allowed to discharge through the proper coil H. The condensers 78 and 79 are charged from a direct current source at 110 having a voltage of 110 volts D.C. The ground is at 111.

When piston B' is moved to force arising from acceleration, it establishes a circuit from contacts K' to N' or contacts K' to M'. This circuit will energize the proper side of relay R.

The relay R then grounds the proper restoring coil H' and applies a voltage to motor S across the connections 62 in the proper direction.

The motor S will then drive the commutator switching arrangement T and shaft 89.

The commutator T has ten segments and as it rotates through each 1/10 revolution, it produces a restoring pulse at the proper coil H' by way of condensers 78 and 79.

As the commutator T rotates, it causes the following sequences: Firstly, the commutator T applies voltage to one of the condensers 78 or 79 and switches the other condenser to the proper restoring coil H'. As it rotates still further, it switches the newly charged condenser to the proper coil and the discharged condenser is now allowed to charge. Thus, alternate charge and discharge occurs once every 1/10 revolution of the switching commutator T.

The commutator continues to rotate until sufficient pulses have been applied to coil H' to result in breaking the circuit at contacts K' and N' or at the contacts K' and M.

The shaft 89 will rotate at an average speed proportional to the acceleration and thus it angular position will be proportional to the total velocity change resulting from the acceleration force. The shaft position will give a reading equivalent to the integrated acceleration.

The velocity change or integrated acceleration which will be indicated by the amount or angular rotation of the shaft 89 may also be expressed as follows:

$$m\frac{dV}{dt} + vc = 0$$

$$\dot{V} = \frac{c}{m} \cdot v$$

where V is the externally applied acceleration and where $v$ is the velocity of the piston relative to the cylinder or housing; where $m$ is the mass of the piston and mercury and $c$ is the damping constant depending upon viscosity of oil and dimensions of passageway 31.

The present accelerometer has the advantage of compactness inasmuch as it avoids pendulums and springs. In addition, since the embodiment of Fig. 4 includes a feedback system, it allows integration in the feed-back loops, giving more accurate determination of the velocity change than could be obtained by external integration of the acceleration.

The sensing device of Fig. 1 may easily be included in a casing 1¾" by ¾" in diameter to give a range to plus or minus six times the force of gravity.

It has an extreme sensitivity to very low acceleration forces due to lack of static or coulomb friction.

By permitting piston B' to pass a considerable distance beyond the point where contact is established, it is possible to preserve a record of accelerations in excess of those which can be handled by the restoring circuit immediately.

Thus, after an acceleration in excess of that which can be metered directly has occurred, the restoration continues until the piston is centered with the result that the excess acceleration is recorded in the circuit of Fig. 4. In the circuit of Fig. 3 the same conditions will apply if the ammeter is replaced by watt hour-meter, which will give a measurement of the time integral of the acceleration force.

The pulse-like or step-wise restoring movements are most advantageous inasmuch as at short intervals the restoration will not be effected by change in viscosity in the interval and restoration force per pulse being constant and keeping the applied voltage and condenser values constant. Each pulse will give an increment of velocity in the measuring system of Fig. 4 and the average current produced by the pulses will serve as a measure of the acceleration. The maximum pulse rate is about 86 pulses per second. The pulsing system is particularly desirable inasmuch as the accuracy of the integration is independent of the motor characteristics and with the pulsing return or step-by-step return the motor will not affect the accuracy of the determination and a most accurate integration devoid of any influence from motor characteristics will be achieved.

The device of the present application compared the outward force to the restoration force and keeps them equal and measures by its oscillation the total change in velocity which has occurred, thus yielding the actual value of the velocity. The integration is due to the oil bodies E at the ends of the piston and they force the piston to move at a terminal velocity due to the applied acceleration which is reached in about 4/10,000 of a second. The piston velocity is thus proportional to the applied acceleration and since the velocity of the vehicle is proportional to the displacement of the piston this displacement when measured by the circuit Fig. 4 will give the present velocity of the vehicle to which the instrument is attached, thus giving the internal integration desired.

The sensing element of Fig. 1 can be used not only to measure accelerations but also to establish a vertical direction, as is often required in the erection of gyroscope mechanisms. In this case the circuit of Fig. 3 is employed with the addition of gyroscope erection coils in series with coils H.

In operation of the device the pistons B or B' will oscillate without being subjected to contact either with the wall of the cylinder or to stops at the end of the cylinder within an upper limit of, for example, a force not exceeding 6 G with the piston on each oscillation moving against the end oil body and being carried or floated by the intermediate mercury body.

Throughout the period of application of the force the measurement will take place step-wise as the piston B is restored to its central position after each displacement toward the end of the cylinder. In both the embodiment of Fig. 3 and the embodiment of Fig. 4 there will be a pulse-wide restoration of the piston to its central location and the piston will be solely retarded by fluid friction resulting from transfer of the oil body through the narrow passageway 33 without any frictional contact with the side of the cylinder and without hitting a stop or acting against a spring.

As a result of this operation, the acceleration force will be integrated within the casing of the device to give velocity information and all this will be accomplished without pickoffs having resistances, inductances or capacitances for the purpose of allowing a signal proportional to the applied acceleration.

As a result of the elimination of dry friction or wall contact friction, a terminal velocity will always be attained which is equivalent to the maximum speed at which the body will move in a liquid under the applied force.

As a result, the piston velocity will be proportional to the applied acceleration and the displacement of the piston will give a correct indication of the velocity of the vehicle or aircraft to which the instrument is attached.

The important features of the present invention reside in the provision of a recessed piston, which recess is positioned between the ends of the piston or the heads of the piston and which recesses will receive a mercury pool which floats the piston in either vertical or horizontal position and which prevents coulomb friction.

Although mercury is preferred, any other substance having a high negative surface tension or non-wetting properties may be employed.

Another feature of the present invention resides in the fact that the rest of the cylinder beyond the ends of the piston is filled with a comparatively—non-compressible liquid—not a compressible fluid or a gas—which preferably has a small change in viscosity with varying temperature.

Through the middle of the piston there is provided a high restriction flow passageway 33 which may also be positioned externally of the cylinder A through which the liquid is forced during the oscillation of the piston B under the applied force.

The present instrument is primarily designed to supply velocity information, but it is also possible to supply acceleration information by eliminating the internal integration.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A velocity meter instrument of the type having a frictionless floating piston member displaced against an oil body by acceleration forces acting in an axial direction, said instrument having a cylinder with its longitudinal axis in the direction in which velocity and acceleration is to be measured, a floating piston encircled by and displacing its weight in an annular pool of mercury held in position between end enlargements on said piston balanced in the direction transverse to the axis so that it will not touch or frictionally contact the walls of the cylinder, said piston being susceptible to movement in the direction of the longitudinal axis means to restore the piston and means to measure said piston restoration force upon restoration after it has been initially displaced by forces acting thereon.

2. A velocity meter instrument of the type having a frictionless floating piston member displaced against an oil body by acceleration forces acting in an axial direction, said instrument having a cylinder with its longitudinal axis in the direction in which velocity and acceleration is to be measured, a floating piston encircled by and displacing its weight in an annular pool of mercury held in position between end enlargements on said piston balanced in the direction transverse to the axis so that it will not touch or frictionally contact the walls of the cylinder, said piston being susceptible to movement in the direction of the longitudinal axis means to restore the piston and means to measure said piston restoration force upon restoration after it has been initially displaced by forces acting thereon, said measuring means including a circuit effective to restore the piston.

3. A velocity meter instrument of the type having a frictionless floating piston member displaced against an oil body by acceleration forces acting in an axial direction, said instrument having a cylinder with its longitudinal axis in the direction in which velocity and acceleration is to be measured, a floating piston balanced in the direction transverse to the axis so that it will not touch or frictionally contact the walls of the cylinder, said piston being susceptible to movement in the direction of the longitudinal axis means to restore the piston and means to measure said piston restoration force upon restoration after it has been initially displaced by forces acting thereon, said measuring means including a circuit effective to restore the piston, said piston being balanced by being floated in a pool of mercury said pool of mercury having the form of an annulus encircling the piston and held in position by enlarged heads on the ends of the piston.

4. The instrument of claim 1, said piston member having enlarged circular glass heads between which enlarged heads is enclosed said mercury pool and having oil pools between the ends of the cylinder and the enlarged heads at the ends of the piston and conduit means extending through the piston member to connect the oil pools in the ends of the cylinder together so that oil may flow freely from one end of the cylinder to the other.

5. A velocity meter instrument of the type having a frictionless floating piston member displaced against an oil body by acceleration forces acting in an axial direction, said instrument having a glass cylinder and floating spaced glass pistons, a central elongated conduit member on which said pistons are mounted, an annular pool of mercury held in position between said pistons and insulating oil bodies filling the space between the outside faces of the pistons and the ends of the cylinder in communication with each other through said conduit means to restore the pistons after displacement and means to record the restoration force upon said pistons upon acceleration.

6. A velocity meter instrument of the type having a frictionless floating piston member displaced against an oil body by acceleration forces acting in an axial direction, said instrument having a glass cylinder and floating spaced glass pistons, a central elongated conduit member on which said pistons are mounted, an annular pool of mercury held in position between said pistons and insulating oil bodies filling the space between the outside faces of the pistons and the ends of the cylinder in communication with each other through said conduit, and means to restore the pistons when displaced by acceleration and means to record the force of restoration necessary.

7. A velocity meter instrument of the type having a frictionless floating piston member displaced against an oil body by acceleration forces acting in an axial direction, said instrument comprising a cylinder member and a piston member floating therein encircled by and displacing its weight in an annular pool of mercury held in position between end enlargements on said piston so that it cannot move transversely but can move longitudinally and will be responsive to forces in the direction of the longitudinal axis parallel to the direction of movement, said piston member being displaced in response to acceleration forces in the direction of its longitudinal axis and shifting position in said cylinder in response to such forces, circuit switch means actuated by said shift in said piston, restoring means to restore said piston member and meter means actuated by said restoring forces to indicate the velocity changes.

8. The instrument of claim 7, said piston member having enlarged heads at the ends thereof and said pool of mercury extending between said heads acting both to float said piston member and also to serve as a circuit connection means.

9. The accelerometer of claim 7, said piston member having extensions and said restoring means consisting of solenoids at the ends of said cylinder member encircling said extensions.

10. The accelerometer of claim 7, said restoring means including an impulse generator to apply a series of impulses to restore said piston member to neutral position after it has been displaced by acceleration forces.

11. The instrument of claim 7, said piston member floating on said central pool of mercury and said oil body forming end pools of a silicone oil.

12. A velocity meter for aircraft having a cylinder with its longitudinal axis mounted in the direction in which velocity is to be measured, a double headed frictionless piston mounted to float therein having a central mercury pool between the heads to float it against friction with the cylinder walls so that it will have complete neutral buoyancy and end silicone oil pools to cause said piston to travel at a terminal velocity for a given applied force in the direction in the axis and to be free of movement in a direction transverse to the axis, said piston having a longitudinal axial through passage to place the end oil pools in communication with one another, said meter having circuitry being actuated by a displacement of said piston and mercury pool and restoration means actuated by said circuitry to give integrated acceleration information.

13. The meter of claim 12 in which said restoration means restores said piston to its initial position in a series of pulses.

14. The meter of claim 12 in which said restoration means acts to restore said piston by a series of pulses and means to convert said pulses to a shaft rotation which will give velocity information.

15. A velocity meter instrument in which a frictionless floating piston member is displaced against an oil body by acceleration forces only in an axial direction and the restoration force is measured upon restoration to give an integrated acceleration or a velocity determination, including a mercury floated piston, a cylinder enclosing said piston without frictional contact therewith and end pools of oil between the ends of the piston and the ends of the cylinder to cause said piston to move at a fixed velocity for a given applied acceleration force and a restricted passage connecting said pools of oil, and a pulsing means to restore said piston to its original position in a series of pulses.

16. The instrument of claim 15 in which means are provided to measure the pulses to give the integrated acceleration.

17. A velocity meter having a cylinder having end chambers and a central annular intermediate chamber and a double headed piston positioned between and forming the end chambers and said heads forming the intermediate chamber, said piston consisting of a central elongated stem having a longitudinal axial narrow through damping passage permitting restricted flow of liquid between the end chambers, the heads consisting of circular disks substantially contacting with slight clearance the walls of said cylinder, said disks being spaced apart on said stem a substantial distance from the ends of the stem, and an annular pool of mercury being positioned between the heads in said interior chamber and the damping passage and end chambers being filled with a damping oil, said mercury being constrained between said heads and prevented from leaking into the end chambers by the slight clearance between the periphery of the heads and the cylinder and the high surface tension of the mercury, and said stem being of a magnetic metal and the ends of the cylinder around the end chambers being provided with electromagnetic coils and the ends of said stem beyond said heads projecting into and reciprocating in said end chambers within said coils and acting as coil armatures and contacts on the walls of the cylinder spaced longitudinally of the cylinder and spaced so that different groups of contacts will be in contact with the mercury pool as the piston reciprocates in said cylinder, and a circuit arrangement actuated from said contacts to energize the coils to restore said piston to a central position upon movement from a central position.

18. A velocity meter having a cylinder having end chambers and a central annular intermediate chamber and a double headed piston positioned between and forming the end chambers and said heads forming the intermediate chamber, said piston consisting of a central elongated stem having a longitudinal axial narrow through damping passage permitting restricted flow of liquid between the end chambers, the heads consisting of circular disks substantially contacting with slight clearance the walls of said cylinder, said disks being spaced apart on said stem a substantial distance from the ends of the stem, and an annular pool of mercury being positioned between the heads in said interior chamber and the damping passage and end chambers being filled with a damping oil, said mercury being constrained between said heads and prevented from leaking into the end chambers by the slight clearance between the periphery of the heads and the cylinder and the high surface tension of the mercury.

19. The velocity meter of claim 18 and said stem being of a magnetic metal and the ends of the cylinder around the end chambers being provided with electromagnetic coils and the ends of said stem beyond said heads projecting into and reciprocating in said end chambers within said coils and acting as coil armatures and contacts on the walls of the cylinder spaced longitudinally of the cylinder and spaced so that different groups of contacts will be in contact with the mercury pool as the piston reciprocates in said cylinder.

20. The velocity meter of claim 18 in which there is provided electrical means to restore said piston to a central position upon displacement by acceleration from said central position, and means to measure the force restoring the piston to the central position.

References Cited in the file of this patent
UNITED STATES PATENTS

| | | |
|---|---|---|
| 1,840,001 | Tsujita | Jan. 5, 1932 |
| 2,332,994 | Draper | Oct. 26, 1943 |
| 2,440,605 | Hathaway | Apr. 27, 1948 |
| 2,591,921 | Cosgriff et al. | Apr. 8, 1952 |
| 2,802,956 | Jarosh et al. | Aug. 13, 1957 |